(12) United States Patent
Csrenko et al.

(10) Patent No.: US 9,406,986 B2
(45) Date of Patent: Aug. 2, 2016

(54) METAL-AIR BUTTON CELLS AND METHOD OF MANUFACTURING THE SAME

(71) Applicant: VARTA Microbattery GmbH, Ellwangen (DE)

(72) Inventors: Cornelia Csrenko, Aalen (DE); Hermann Löffelmann, Ellwangen (DE); Thomas Haake, Ellwangen (DE); Alexander Brenner, Ellwangen (DE)

(73) Assignee: Varta Microbattery GmbH (DE)

( * ) Notice: Subject to any disclaimer, the term of this patent is extended or adjusted under 35 U.S.C. 154(b) by 204 days.

(21) Appl. No.: 14/326,600

(22) Filed: Jul. 9, 2014

(65) Prior Publication Data

US 2015/0024290 A1    Jan. 22, 2015

(30) Foreign Application Priority Data

Jul. 17, 2013   (EP) .................................... 13176777

(51) Int. Cl.
*H01M 12/08*    (2006.01)
*H01M 12/06*    (2006.01)
*H01M 2/02*     (2006.01)
*H01M 4/86*     (2006.01)
*H01M 4/24*     (2006.01)

(52) U.S. Cl.
CPC ............ *H01M 12/08* (2013.01); *H01M 2/0222* (2013.01); *H01M 4/8605* (2013.01); *H01M 12/06* (2013.01); *H01M 4/244* (2013.01); *Y02E 60/50* (2013.01)

(58) Field of Classification Search
CPC ............................... H01M 12/06; H01M 12/08
See application file for complete search history.

(56) References Cited

U.S. PATENT DOCUMENTS

| | | | |
|---|---|---|---|
| 4,054,726 A | 10/1977 | Sauer et al. | |
| 4,892,637 A | 1/1990 | Sauer et al. | |
| 2008/0254345 A1* | 10/2008 | Broburg | H01M 12/065 429/71 |
| 2013/0183596 A1* | 7/2013 | Gaugler | H01M 2/0222 429/406 |
| 2014/0030611 A1 | 1/2014 | Pytlik et al. | |

FOREIGN PATENT DOCUMENTS

| | | | | |
|---|---|---|---|---|
| DE | 25 35 269 A1 | 2/1977 | | |
| DE | 37 22 019 A1 | 1/1989 | | |
| DE | 10 2010 039 557 A1 | 2/2012 | | |
| DE | WO 2012022778 A1 * | 2/2012 | ......... | H01M 2/0222 |
| EP | 0 289 704 A1 | 11/1988 | | |
| WO | WO 2012/139933 A1 | 10/2012 | | |

* cited by examiner

*Primary Examiner* — Stewart Fraser
(74) *Attorney, Agent, or Firm* — DLA Piper LLP (US)

(57) ABSTRACT

Metal-air button cells including a closed cell housing and, arranged therein, an air cathode and a metal-based anode separated from one another by a separator, wherein the cell housing is substantially composed of a first housing half-part and a second housing half-part; the housing half-parts are configured to be cup-shaped and have a base and a circumferential side wall; the base of the second housing half-part has one or more entry and/or exit openings for atmospheric oxygen; and the air cathode is configured to be disc-shaped and is positioned on the base of the second housing half-part such that it covers the entry and/or exit openings and its periphery bears on the inner side of the circumferential side wall of the second housing half-part.

7 Claims, 1 Drawing Sheet

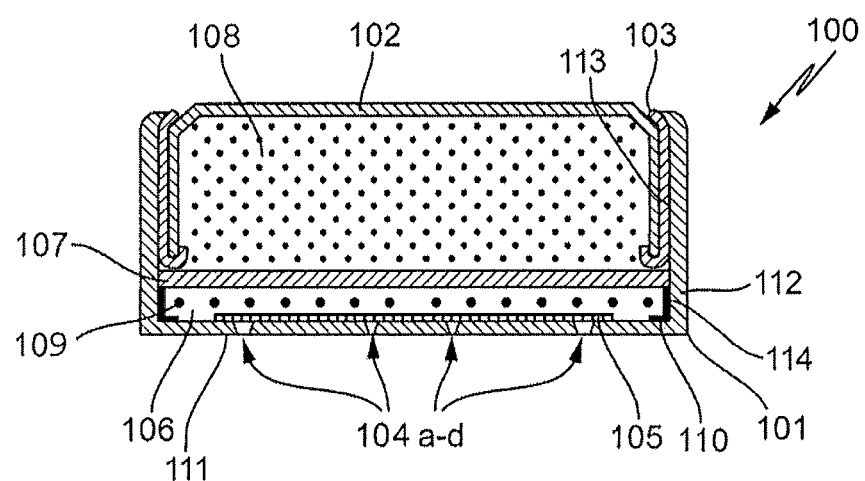

METAL-AIR BUTTON CELLS AND METHOD OF MANUFACTURING THE SAME

TECHNICAL FIELD

This disclosure relates to metal-air button cells and to a method of manufacturing the same.

BACKGROUND

Metal-air cells usually contain as electrochemically active components a metal-based anode and an air cathode separated from one another by an ion-conductive electrolyte. When discharging, oxygen is reduced on the air cathode while taking up electrons. Hydroxide ions which can migrate via the electrolyte to the anode are produced. There, a metal is oxidized by electron donation. The metal ions produced react with the hydroxide ions.

Both primary and secondary metal-air cells exist. A secondary metal-air cell is recharged in that a voltage is applied between the anode and the cathode and the electrochemical reaction described is reversed. Oxygen is released in the process.

The best known example of a metal-air cell is the zinc-air cell. It is used in the form of a button cell in particular as a battery for hearing aids.

Metal-air cells have a very high energy density, since the requirement for oxygen on the cathode can be covered by ambient atmospheric oxygen. Accordingly, atmospheric oxygen has to be supplied to the cathode during the discharging operation. Conversely, oxygen produced on the air cathode during the charging operation of a metal-air cell has to be evacuated. For these reasons, metal-air cells typically have housings provided with corresponding entry and/or exit openings. Typically, holes are stamped into the housings as entry and/or exit openings.

Gas-diffusion electrodes are usually employed in metal-air cells as an air cathode. Gas-diffusion electrodes are electrodes in which the materials involved in the electrochemical reaction (typically a catalyst, an electrolyte and atmospheric oxygen) are present alongside one another in a solid, liquid and gaseous state and can come into contact with one another. When discharging, the catalyst catalyses the reduction of atmospheric oxygen and, if applicable, also the oxidation of hydroxide ions when charging the cells.

Very often, plastic-bound gas-diffusion electrodes are employed as air cathodes in metal-air cells. Such gas-diffusion electrodes are disclosed in DE 37 22 019 A1, for example. In such electrodes, a plastic binder (for example, polytetrafluorethylene (PTFE)) configures a porous matrix in which the particles of an electro-catalytically active material (for example, a precious metal such as platinum or palladium, or of a manganese oxide) are embedded. Those particles have to be able to catalyze the reaction of atmospheric oxygen. Manufacturing of such electrodes most typically takes place by rolling a dry mixture of binder and catalyst to form a film. In turn, the film can be rolled into a metal mesh, for example, a mesh of silver, nickel or silver-plated nickel. The metal mesh forms a conductor structure within the electrode and serves as a current conductor.

The entry and/or exit openings for oxygen are most typically incorporated into the base of the housing of a metal-air cell, in particular, in the case of a button cell. For oxygen entering through the openings to be able to contact the air cathode as immediately as possible, the air cathode in such cells is usually positioned flat on the housing base to cover the openings. If applicable, it may be advantageous to provide an air distributor, for example, a porous filter paper between the air cathode and the housing base. However, this is not required in all cases.

If oxygen is now reduced in an air cathode positioned in this manner, the electrons released are typically evacuated via the conductor structure. The latter is usually directly connected to a part of the housing which can serve as a terminal.

We found in tests that metal-air cells having the narrated construction often have high variance in as far as their electrochemical properties are concerned. In this manner, individual cells typically have markedly higher impedance values than would have been expected on average.

SUMMARY

We provide a metal-air button cell including a closed cell housing and, arranged therein, an air cathode and a metal-based anode separated from one another by a separator, wherein the cell housing is substantially composed of a first housing half-part and a second housing half-part, the housing half-parts are configured to be cup-shaped and have a base and a circumferential side wall, the base of the second housing half-part has one or more entry and/or exit openings for atmospheric oxygen, the air cathode is disc-shaped and positioned on the base of the second housing half-part such that it covers the entry and/or exit openings and its periphery bears on an inner side of a circumferential side wall of the second housing half-part, an electrically conductive coating is arranged on the inner side of the side wall at a height on which the periphery bears, and the electrically conductive coating has a matrix of a binding agent and, embedded therein, electrically conductive particles.

We also provide a metal-air button cell including a closed cell housing and arranged therein, an air cathode and a metal-based anode separated from one another by a separator, wherein the cell housing is substantially composed of a first housing half-part and a second housing half-part, the housing half-parts are configured to be cup-shaped and have a base and a circumferential side wall, the base of the second housing half-part has one or more entry and/or exit openings for atmospheric oxygen, the air cathode is configured to be disc-shaped and positioned on the base of the second housing half-part such that it covers the entry and/or exit openings and its periphery bears on an inner side of the circumferential side wall of the second housing half-part, and an electrically conductive coating is arranged on the inner side of the side wall at a height on which the periphery bears.

We further provide a method of manufacturing the metal-air button cell including a closed cell housing and arranged therein, an air cathode and a metal-based anode separated from one another by a separator, wherein the cell housing is substantially composed of a first housing half-part and a second housing half-part, the housing half-parts are configured to be cup-shaped and have a base and a circumferential side wall, the base of the second housing half-part has one or more entry and/or exit openings for atmospheric oxygen, the air cathode is configured to be disc-shaped and positioned on the base of the second housing half-part such that it covers the entry and/or exit openings and its periphery bears on an inner side of the circumferential side wall of the second housing half-part, and an electrically conductive coating is arranged on the inner side of the side wall at a height on which the periphery bears, including providing a first and a second housing half-part, wherein the housing half-parts are configured to be cup-shaped and have a base and a circumferential side wall and wherein the base of the second housing half-part has one or more entry and/or exit openings for atmospheric oxygen, positioning or forming a metal-based anode within the first housing half-part, (a) positioning a disc-shaped air cathode on the base of the second housing half-part such that it covers the entry and/or exit openings and its periphery bears on the inner side of the circumferential side wall of the second housing half-part, and covering the cathode with a separator or, alternatively, (b) positioning a disc-shaped cathode-separator composite on the base of the second housing half-part, assembling the cell housing by inserting the first housing half-part having the metal-based anode into the second housing half-part and sealing the cell housing by a beading process, and an electrically conductive coating is applied on the inner side of the side wall at that height on which the periphery bears.

BRIEF DESCRIPTION OF THE DRAWING

FIG. 1 is a schematic cross-sectional illustration of an example of our metal-air cell.

DETAILED DESCRIPTION

Our metal-air cells comprise a closed cell housing and, arranged therein, an air cathode and a metal-based anode, as is known. The air cathode and the anode are separated from one another by a separator. Most typically, both, the cathode and the anode as well as the separator are in direct contact with an electrolyte via which the ions can migrate from one electrode to another. In most cases, cathode, anode and separator are impregnated with the electrolyte.

The electrolyte is most typically an aqueous electrolyte containing potassium hydroxide or sodium hydroxide in dissolved form. The separator may be a porous plastic film, for example.

The housing of the cell is substantially composed of a first housing half-part and a second housing half-part. The first housing half-part preferably receives the air cathode, the second receives the metal-based anode. Apart therefrom, the housing most typically comprises only a seal arranged between the housing half-parts and electrically insulates the housing half-parts from one another.

The housing half-parts are preferably configured to be cup-shaped and in each case thus have a base and a circumferential side wall of constant height (when viewed from the base). The side wall comprises a terminal periphery defining a typically circular, optionally also an oval, opening. In turn, also the base is configured to be preferably circular or, if applicable, also oval. The side wall and the base preferably enclose an angle of 90° to 120°, particularly preferably of exactly 90°. In other words, the side wall particularly preferably sits in an orthogonal manner on the base. The entry and/or exit openings mentioned at the outset for atmospheric oxygen, which the housing of a cell has like any other known metal-air cell, are preferably incorporated into the base of the second housing half-part.

The air cathode is configured to be preferably disc-shaped, in particular as a circular disc, and positioned on the base of the second housing half-part. It covers the entry and/or exit openings. Its periphery bears on the inner side of the circumferential side wall of the second housing half-part. In other words, the air cathode preferably completely covers the base of the second housing half-part.

It is preferable for the air cathode of our cell to have a metallic conductor structure like the gas-diffusion electrodes disclosed in DE 37 22 019 A1. The metallic conductor structure is most typically embedded in a plastic matrix, usually together with a catalyst capable of reducing atmospheric oxygen.

As can be obtained from DE 37 22 019 A1, the air cathodes may be manufactured in the shape of tapes having a thickness of significantly less than one millimeter. From these tapes, air cathodes for button cells can be blanked and/or cut out in an accurately fitting manner, for example, in the disc shape required for the button cells.

The metal-air cell is particularly distinguished by an electrically conductive coating arranged on the inner side of the side wall at the height on which the periphery of the air cathode bears. The coating is preferably present in the form of a circumferential strip forming a circle. It is also possible for the coating to be applied, for example, in the form of one or a plurality of individual spots.

We found that, on account of this measure which is, in principle, very simple, the variance of the impedance values can be rolled back in an unexpectedly significant manner. As mentioned above, conductor structures via which electrons can be supplied to the air cathode or can be conducted away therefrom, are often integrated in air cathodes. In the case of classic cells, the electrical contact between these conductor structures and the corresponding housing terminal is obviously inadequate in individual cases and, therefore, causes the high impedance values. This can be counteracted by way of the electrically conductive coating.

The coating typically has a matrix of a binding agent and, embedded therein, electrically conductive particles, in particular a carbon-based material such as carbon black or graphite and/or of a metal such as silver, nickel or copper. The weight fraction of the particles in the coating should not be below 75%. It is preferably >90%.

The coating is particularly preferably formed from a paste, in particular a printable and/or dosable paste. The paste may contain, for example, carboxymethylcellulose (CMC), polyacrylic acid or a derivative of these compounds as a binding agent. Moreover, it mostly also has a solvent, for example, water or an alcohol. Binding agents which can be processed in organic solvents may also be employed. As electrically conductive particles, the coating preferably contains graphite particles or carbon-black particles. The solids proportion of the paste, in particular the fraction of electrically conductive particles contained therein, is preferably 25% by weight to 75% by weight. The paste may be applied by, for example, a printing process or by a dosing needle.

Preferably, the coating is formed from an adhesive. The adhesive preferably contains a synthetic plastic or a corresponding precursor, in particular an epoxy, a polyimide or a polyamide, as a binding agent. The adhesive may be a hot-melt adhesive applied in a correspondingly liquefied form, for example, by a dosing needle. However, employment of binding agents applied and cured at room temperature is preferred. Both binding agents which cure thermally and which can be cured by ultraviolet radiation, i.e., contain photo-chemically curable components, can be considered. Suitable epoxy and electrically conductive polyimide adhesives have the required properties known from the microelectronics field, for example.

The coating may furthermore also be a paste having adhesive properties. To manufacture such a paste, polymer additives having adhesive properties, for example, a fraction of one of the mentioned synthetic plastics may be added to the mentioned pastes.

The coating improves the impedance values of metal-air cells. However, it may additionally also secure the air cathode in its position on the base of the second housing half-part.

While, in the case of classic cells, the air cathode is typically held in its position in an exclusively mechanical manner, it is possible to additionally provide, for example, a material-integral adhesive connection between the air cathode and the housing. An additional clamping pressure may also be generated by way of the coating.

Preferably, the periphery of the air cathode is embedded in the coating, i.e., is covered by the mentioned coating completely and on both sides.

It may preferably be provided for a porous air distributor to be arranged between the air cathode and the base of the first housing half-part. An air distributor of this type may be, for example, a porous plastic film, a non-woven fabric or a porous filter paper.

However, an air distributor of this type is not mandatory. In this manner, for example, DE 10 2010 039 557 A1 discloses a construction mode of a metal-air button cell without an air distributor between the housing base and the air cathode.

The separator, too, is preferably configured to be disc-shaped. It is typically positioned on that side of the air cathode facing away from the base of the second housing half-part and preferably specifically directly on the air cathode. The periphery of the separator, like the periphery of the disc-shaped air cathode, preferably bears on the inner side of the circumferential side wall of the second housing half-part. The separator subdivides the interior of the cell housing into two compartments, one of which is taken up by the air cathode with the metal-based anode being arranged in the other.

The metal-air cell is particularly preferably a zinc air cell. Zinc air cells, as metal-based anodes, contain known zinc powder as anode material.

The method serves for manufacturing a metal-air button cell, as has been described above. It comprises at least the following steps:

- providing a first and a second housing half-part, wherein the housing half-parts are configured to be cup-shaped and have a base and a circumferential side wall and wherein the base of the second housing half-part has one or more entry and/or exit openings for atmospheric oxygen,
- positioning or forming a metal-based anode within the first housing half-part,
- (a) positioning a disc-shaped air cathode on the base of the second housing half-part such that it covers the entry and/or exit openings and its periphery bears on the inner side of the circumferential side wall of the second housing half-part, and covering the cathode with a separator or alternatively (b) positioning a disc-shaped cathode-separator composite on the base of the second housing half-part,
- assembling the cell housing by inserting the first housing half-part having the metal-based anode into the second housing half-part and sealing the cell housing, in most cases by a beading process, It is known from WO 2012/139933 A1 that both, air cathodes and air-cathode separator composites can be manufactured by way of pressure. In principle, of course, composites of this type can also be installed in our button cells. This explains consideration of the above variant (b).

The method is particularly distinguished in that an electrically conductive coating is applied on the inner side of the side wall of the second housing half-part at that height on which the periphery of the disc-shaped air cathode bears after having been positioned. The nature of the electrically conductive coating has already been described in the context of the explanations pertaining to the metal-air cell so that further explanations are not required.

Most typically, the coating is applied before the air cathode is positioned on the base of the second housing half-part. Details can be found in the following example. It should be emphasized that the latter serves merely as an explanation and for the better understanding and is not to be understood to be in any way limiting.

To manufacture our metal-air cell, a button-cell cover having a circular base and a circumferential side wall was provided as a first housing half-part. The outer side of the side wall was covered with an annular plastic seal. Subsequently, to form an anode, zinc powder mixed with an electrode binder was dosed into the housing half-part and impregnated with an aqueous alkaline electrolyte.

Parallel thereto, a button-cell cup, likewise having a circular base and a circumferential side wall, was provided as a second housing half-part. A plurality of openings having a diameter of approx. 0.5 mm were incorporated into the base of the button-cell cup (diameters are usually between 0.1 and 0.8 mm) to enable a supply and/or evacuation of atmospheric oxygen to and from the cell. To form the electrically conductive coating, a circumferential strip of a conductive paste having adhesive properties and a high fraction of graphite particles as electrically conductive particles, was formed proceeding from the base up to a height of approx. 2 mm, on the inner side of the side wall of the housing cup. After having left the solvent contained in the paste to evaporate (drying step), a non-woven fabric which covered the openings in the base of the button-cell cup and served as an air distributor was placed into the cup. In a further step, a disc-shaped air cathode, as known from DE 37 22 019 A1, was positioned on the air distributor in the button-cell cup such that its periphery came to bear on the inner side of the second housing half-part covered with the conductive paste.

It should be mentioned in the context of the drying step that the latter may be scheduled after placement of the air cathode and, if applicable, after placement of the air distributor. This is in particular preferable when a material-integral adhesive connection is to be formed between the air cathode and the housing.

In the next step, the cup unit and the cover unit which had been pre-assembled according to the above description were assembled. To this end, the housing cover having the anode arranged therein was inserted into the housing cup having the air cathode arranged therein. Subsequently, the housing was sealed by folding the opening periphery of the button-cell cup radially towards the inside (beading process).

In FIG. 1, the cell 100 comprises a cell housing composed of the cell cup 101, the cell cover 102 and the seal 103. The latter is arranged between the cell cup 101 and the cell cover 102 and electrically separates the two from one another. The cell cup 101 and the cell cover 102 are configured to be cup-shaped and in each case have a base and a circumferential side wall. The entry and/or exit openings 104a-d, via which atmospheric oxygen can enter into the cell 101, are incorporated into the base 111 of the button-cell cup 101. The base 111 of the button-cell cup 101 is covered with the air distributor 105. In turn, the latter is completely covered by the disc-shaped air cathode 106 which is separated by the separator 107 from the anode space in which the zinc anode 108 is arranged. The periphery of the air cathode 106 radially bears on the inner wall of the button-cell cup 101. Metallic filaments 109 are embedded in the air cathode 106 as a conductor structure. The filaments exit from the periphery of the air cathode 106. The electrically conductive coating 110 which covers the inner wall 113 of the side wall 112 at the height 114, on which the periphery bears, forms a conductive contact in the form of a circumferential strip between the periphery of the air cathode 106 and, therefore, the filaments 109 and the inner side 113 of the housing cup 101. The coating 110 also partially covers the base of the housing cup 101. On account of the coating 110, the air cathode 106 is secured in its position, on the one hand, and the electrical contact between the air cathode 106 and the button-cell cup 101 is improved, on the other hand.

The invention claimed is:

1. A metal-air button cell comprising a closed cell housing and, arranged therein, an air cathode and a metal-based anode separated from one another by a separator, wherein
the cell housing is substantially composed of a first housing half-part and a second housing half-part,
the housing half-parts are configured to be cup-shaped and have a base and a circumferential side wall,
the base of the second housing half-part has one or more entry and/or exit openings for atmospheric oxygen,
the air cathode is disc-shaped and positioned on the base of the second housing half-part such that it covers the entry and/or exit openings and its periphery bears on an inner side of a circumferential side wall of the second housing half-part,
an electrically conductive coating is arranged on the inner side of the side wall at a height on which the periphery bears, and
the electrically conductive coating has a matrix of a binding agent and, embedded therein, electrically conductive particles.

2. The cell according to claim 1, wherein the coating has a matrix of a binding agent and, embedded therein, electrically conductive particles of a carbon-based material and/or of a metal.

3. The cell according to claim 1, wherein the coating is formed from an adhesive comprising an epoxy, a polyimide or a polyamide as a binding agent.

4. The cell according to claim 1, wherein the coating is formed from a paste, in particular a printable and/or dosable paste, having a cellulosic derivate or a polyacrylate as a binding agent.

5. The cell according to claim 1, wherein a porous air distributor is arranged between the air cathode and the base of the first housing half-part.

6. A method of manufacturing a metal-air button cell according to claim 1, comprising:
providing a first and a second housing half-part, wherein the housing half-parts are configured to be cup-shaped and have a base and a circumferential side wall and wherein the base of the second housing half-part has one or more entry and/or exit openings for atmospheric oxygen,
positioning or forming a metal-based anode within the first housing half-part,
(a) positioning a disc-shaped air cathode on the base of the second housing half-part such that it covers the entry and/or exit openings and its periphery bears on the inner side of the circumferential side wall of the second housing half-part, and covering the cathode with a separator or, alternatively, (b) positioning a disc-shaped cathode-separator composite on the base of the second housing half-part,
assembling the cell housing by inserting the first housing half-part having the metal-based anode into the second housing half-part and sealing the cell housing by a beading process, and
an electrically conductive coating is applied on the inner side of the side wall at that height on which the periphery bears.

7. The method according to claim 6, wherein the coating is applied before the air cathode is positioned on the base of the second housing half-part.

* * * * *